United States Patent [19]
Nguyen et al.

[11] Patent Number: 5,698,621
[45] Date of Patent: Dec. 16, 1997

[54] PRINTABLE SELF-CLINGING POLYVINYL CHLORIDE FILM AND METHODS RELATING THERETO

[75] Inventors: Bach T. Nguyen; Tomiki Matsumoto; Toshihiro Katagiri, all of Everett, Wash.

[73] Assignees: Achilles USA, Inc., Everett, Wash.; Achilles Corporation, Tokyo, Japan

[21] Appl. No.: 418,527

[22] Filed: Apr. 7, 1995

Related U.S. Application Data

[63] Continuation of Ser. No. 104,236, Aug. 9, 1993, abandoned, which is a continuation of Ser. No. 847,722, Mar. 6, 1992, abandoned.

[51] Int. Cl.⁶ .................. C08J 5/18; C08L 27/06
[52] U.S. Cl. .................. 524/297; 524/127; 524/128; 524/141; 524/293; 524/294; 524/317; 524/318
[58] Field of Search ................ 524/127, 128, 524/141, 297, 293, 294, 317, 318

[56] References Cited

U.S. PATENT DOCUMENTS

| | | | |
|---|---|---|---|
| 3,674,730 | 7/1972 | King | 260/23 XA |
| 3,919,158 | 11/1975 | Randell et al. | 260/30.6 R |
| 4,002,702 | 1/1977 | Kuhn | 260/899 |
| 4,278,483 | 7/1981 | Mansolillo | 156/79 |
| 4,751,261 | 6/1988 | Miyata et al. | 524/181 |
| 4,839,409 | 6/1989 | Conroy | 524/179 |
| 5,225,267 | 7/1993 | Ochi et al. | 428/214 |
| 5,304,411 | 4/1994 | Rusincovitch | 428/141 |

*Primary Examiner*—Vasu Jagannathan
*Assistant Examiner*—U. K. Rajguru
*Attorney, Agent, or Firm*—Seed and Berry LLP

[57] ABSTRACT

There is disclosed a printable self-clinging flexible film containing a polymerized PVC-based resin, a primary plasticizer and a stabilizer. The film exhibits high tackiness and surface tension, and printing ink may be applied directly to the surface of the film. Compositions for forming the film, and related methods are also disclosed.

19 Claims, 1 Drawing Sheet

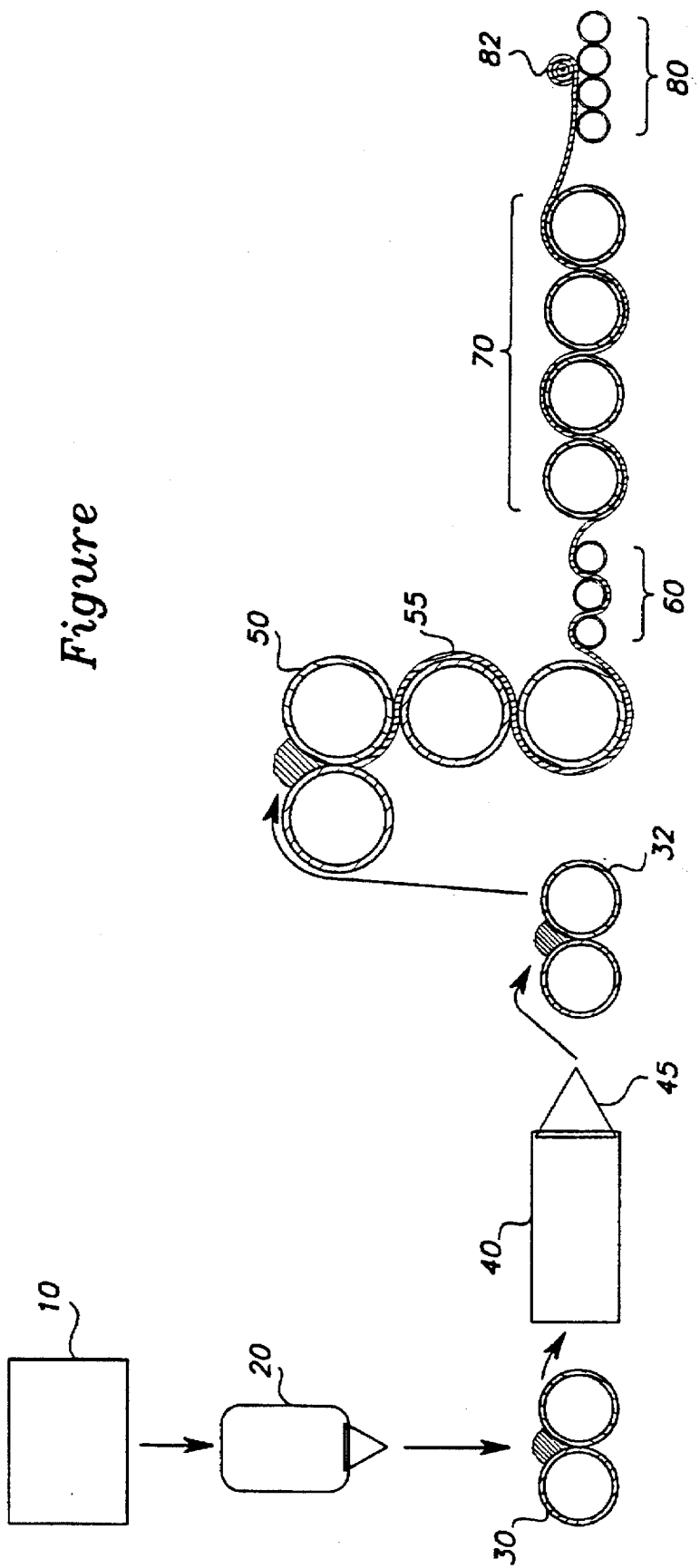

PRINTABLE SELF-CLINGING POLYVINYL CHLORIDE FILM AND METHODS RELATING THERETO

CROSS-REFERENCE TO RELATED APPLICATION

This application is a continuation of U.S. patent application Ser. No. 08/104,236, filed Aug. 9, 1993 now abandoned, which is a continuation of U.S. patent application Ser. No. 07/847,722, filed Mar. 6, 1992, now abandoned.

TECHNICAL FIELD

This invention relates generally to a PVC film and, more specifically, to a self-clinging flexible PVC-based film which has greater receptivity to printing ink.

BACKGROUND OF THE INVENTION

A polymer is a large molecule formed by the union or polymerization of smaller molecules (monomers). For example, polymerization of vinyl chloride yields the polymer polyvinyl chloride (—$(CH_2$—$CHCl)_n$—). A mixed polymer, called a copolymer, is formed by the copolymerization of two or more different molecules. For example, the copolymer polyvinyl chloride acetate is made by the copolymerization of vinyl chloride and vinyl acetate.

Polyvinyl chloride (commonly referred to as "PVC") has been used for a number of years in the manufacture of soft, flexible films for food packaging, in molded rigid products (such as pipes, fibers, upholstery and bristles), and in a variety of other products, including electric wire and cable-coverings, film finishes for textiles, raincoats, belting, gaskets and shoe soles.

PVC film is made by the polymerization and copolymerization of polyvinylchloride and other monomers. Traditional PVC film does not possess good printing properties with respect to low viscosity water- and alcohol-based inks, especially when the ink is applied thinly. In addition, such inks do not exhibit good sharpness when applied to PVC film, have longer drying times, and are easily lifted from the surface of the film.

In order to provide a PVC film suitable for printing purpose, a surface coating has traditionally been applied to the film which is more receptive to printing ink. While application of a surface coating to PVC film improves its printability, the surface coating presents a number of drawbacks. For example surface coatings suitable for printing are often rigid, and sudden stress can crack the coating. When this occurs, ink settles in the cracks or depressions and produces an uneven ink surface. In addition, a rigid surface coating results in dimensional instability to the PVC film and, when the PVC film shrinks, will curl due to the rigidity of the surface coat.

Accordingly, there is a need in the art for a flexible PVC film which is suitable for printing, but which avoids the problems associated with application of a surface coating. In addition, there is a need in the art for improved formulations for the manufacture of PVC film having a surface tension suitable for printing directly on the surface of the PVC film. Similarly, there is a need for PVC films which are self-clinging, and thus adhere to flat, smooth surfaces (such as glass) when applied. The present invention provides such a printable self-clinging flexible PVC film, and further provides ocher related advantages.

SUMMARY OF THE INVENTION

Briefly stated, in one embodiment of the present invention, a printable self-clinging flexible film made from PVC-based resin is disclosed. The film is a polymerized PVC-based resin containing a primary plasticizer in an amount ranging from 40 to 90 parts per hundred resin ("PPHR") and a stabilizer in an amount ranging from 0.1 to 10 PPHR, and has a thickness ranging from 0.002 to 0.02 inch (1 mil=0.001 inch). The film has a surface tension greater than 35 dynes/cm, and preferably greater that 37 dynes/cm, and exhibits superior printability and tackiness properties. Optional additives, such as ultraviolet inhibitors and pigments, may also be present in the film.

In another embodiment, compositions for use in the manufacture of a printable self-clinging flexible film are disclosed. These compositions comprise a polymerizable PVC-based resin, a primary plasticizer, and a stabilizer. In yet a further embodiment, methods of manufacturing a self-clinging flexible PVC-based film suitable for printing from the above compositions is also disclosed.

Other aspects of the present invention will become evident upon reference to the following detailed description.

BRIEF DESCRIPTION OF THE DRAWING

The FIGURE illustrates the formation of a film according to the present invention by a calendering process.

DETAILED DESCRIPTION

The self-clinging flexible film of the present invention will adhere to a flat surface for a extended period of time without the aid of adhesive. For example, when the film is placed on a glass surface, it will remain affixed to the surface for an indefinite period of time. This property of the film is referred to herein as "self-clinging", and represents films which exhibit a high tackiness (i.e., stickiness). The films of the present invention find wide application, and are useful in instances were printed films are to be affixed to flat surfaces.

In addition to being self-clinging, the films of the present invention are suitable for printing without the addition of a surface coating or other preprinting treatments. The receptivity to printing ink is measured by a property called "surface tension". Traditional PVC films have surface tensions ranging from 31 to 35 dynes/cm. The films of the present invention exhibit surface tensions in excess of 35 dynes/cm (and preferably greater than 37 dynes/cm and less than 44 dynes/cm), and are more receptive to printing ink. Surface tension is determined by application of a formamide/ethyl cellosolve solution on the film surface. The solution used to perform this test is specified in ASTM D-2578-84 (American Standard Test Method, vol. 08.03, pp 461–464).

The film of the present invention has a surface tension greater than 35 dynes/cm (at room temperature), and superior printability. The surface tension of the film is a permanent state of the film, and does not reduce in value by more than about 2 dynes/cm for the life of the film under normal usage condition. Water-based and alcohol-based inks applied very thinly to the film exhibit the favorable properties listed below:

Ink is very sharp in color;
Film has good ink adherence and fast drying time; and
Film retains very high-tackiness property.

Prior to the present invention, self-clinging films made from PVC resin had surface tensions lower than 35 dynes/cm, had average to poor printability, and ink applied to the surface of the film did not appear sharp in color.

The films of the present invention are made from PVC-based resin, a primary plasticizer and a stabilizer. As used herein, the term "PVC-based resin" means that the resin may include both polyvinyl chloride resin(s) and copolymers thereof. Copolymers of polyvinyl chloride are formed by the copolymerization of polyvinyl chloride and other monomers or monomer blends. Suitable monomers include, but are not limited to, vinyl acetate, ethylene, propylene, maleate, methacrylate, acrylate, high alcohol vinyl ester, urethane, chlorinated urethane, methylmethacrylate, and mixtures thereof. Monomer blends include, but are not limited to, ethylene-vinyl acetate copolymer, acrynitril-butadiene-styrene terpolymer, acrynitrile-butadiene copolymer, and mixtures thereof. The monomers or monomers blends may be present in an amount up to 10 parts per hundred resin (the term "parts per hundred resin" is used herein to define the quantity of the component based on the weight of the resin and is abbreviated "PPHR").

PVC resins of the present invention have a degree of polymerization ("$\bar{p}$") which is between 650 and 1600, (preferably between 900 and 1100), and an inherent viscosity ("i.v.") between 0.6 and 1.2 (based on ASTM D-1243). The PVC-based resin of the present invention may be formulated from a single PVC resin or a mixture of two or more different PVC resins. When two or more different PVC resins are used, the PVC resins preferably have degrees of polymerization which are relatively dose in value.

The primary plasticizer serves to provide flexibility to the film and includes the following compounds: butyl benzyl phthalate (BBP), bis-2-methoxyethyl phthalate (BMEP), trixylenyl phosphate (TXP), cresyldiphenyl phosphate (CDPP), cresyldixylenyl phosphate (CDXP), triphenyl phosphate (TPP), tricresyl phosphate (TCP), tris-dichloropropyl phosphate (TDPP), polypropylene glycol polyadipate (PPGPA), polybutylene glycol polyadipate (PBGPA), and mixtures thereof. The primary plasticizer is present in the film in an amount ranging from 40 to 90 PPHR, preferably from 45 to 73 PPHR, and most preferably from 49 to 61 PPHR.

In addition to the primary plasticizer, general plasticizers may also be present, provided the surface tension of the film remains greater that 35 dynes/cm. The general plasticizers of the present invention include, but are not limited to, the following compounds: di-n-octyl phthalate, di-2-ethylhexyl phthalate, dibutyl phthalate, diisononyl phthalate, diisobutyl phthalate, didecyl phthalate, dibenzyl phthalate, dicyclohexyl phthalate, dinonyl phthalate, octylcapryl phthalate, tributyl phosphate, triethyl phosphate, trichloroethyl phosphate, trioctyl phosphate, tris-isopropylphenyl phosphate, dibutyl sebacate, dioctyl sebacate, triacetyl glycerine, glycerol sebacate, diisodecyl succinate, diisodecyl adipate, di-n-butyl maleate, tri-n-butyl citrate, methylacetyl riconolate, butyl oleate, glycerin monoricinolate, trimellitates, chloride paraffin, and mixtures thereof. The ratio of primary plasticizer to general plasticizer is greater than 1:1 to achieve a film surface tension which is greater than 35 dynes/cm (in other words, the general plasticizer is preferably less than 50% of the total amount of primary and general plasticizer).

The stabilizers of the present invention include metal soaps, organic phosphites, epoxy compounds, tin stabilizers, and mixtures thereof. The stabilizers provide protection against deficient PVC homopolymerization and copolymerization, and functions to eliminate or slow down the process of polymer degradation. The total mount of stabilizer present in the film ranges from 0.1 to 10 PPHR, preferably from 1 to 7 PPHR, and most preferably 2 to 5 PPHR. Preferably, the stabilizer is a mixture of metal soaps and epoxy compounds, or a mixture of metal soaps, epoxy compounds and organic phosphites.

Metal soap stabilizers include zinc stearate, barium stearate, calcium stearate, cadmium stearate, barium ricinolate, calcium oleate, calcium laurelate, zinc octoate, and mixtures thereof. Preferably, the metal soap stabilizers are mixtures of barium stearate, zinc stearate and cadmium stearate. A preferred barium stearate/zinc stearate mixture is sold by Bearlocher (Chemgrade UBZ-791), and preferred calcium stearate/zinc stearate and barium stearate/cadmium stearate mixtures are sold by Azko Interstab. (CZ-19A and BC-103L, respectively).

Epoxy compound stabilizers include epoxy soybean oil ("ESO"), epoxy linseed oil, epoxy polybutadiene, epoxy methylstearate, epoxy stearate, epoxy ethylhexyl stearate, epoxy stearyl stearate, epoxy propyl isocyanalate 3-(2-case INO)-1, 2-epoxy propane, epoxy-bis-phenol A didiglycyzyl ester, vinyl dicyclohexanediepoxide, 2,2-bis-(4-hydroxyphenol) propane and epichlorohydrine condensation copolymeration, and mixtures thereof.

Organic phosphite stabilizers include diphenyldecyl phosphite, triphenyl phosphite, tris-nonylphenyl phosphite, tri-steareal phosphite, octyldiphenyl phosphite, and mixtures thereof.

Tin stabilizers include tin dilaurate, dibutyl tin maleate, organic tin mercaptide and organic tin sulfonic amide, and mixtures thereof.

The above stabilizers may be used individually or in any combination. Preferably, the stabilizers of the present invention are mixtures of zinc stearate, barium stearate, calcium stearate, and epoxy compounds. A preferred epoxy stabilizer is epoxy soybean oil. In addition, organic phosphites may be used in conjunction with the zinc stearate, barium stearate, cadmium stearate, and epoxy compound mixtures. Particularly preferred stabilizer mixtures are barium stearate/zinc stearate and ESO, calcium stearate/zinc stearate and ESO, and barium stearate/cadmium stearate and ESO.

In addition to the PVC-based resin, primary plasticizer(s) and stabilizer(s), the film may include additional additives, such as anti-static agents, anti-fogging agents, ultra-violet inhibitors, anti-oxidants, light stabilizers, fire retardants, pigments, and mixtures thereof. These additives are generally know in the art and may be present in the film in an amount sufficient to impart the desired property (generally below 10 PPHR).

Anti-static and anti-fogging agents include sorbitan fatty ester, sorbitol fatty ester, glycerine fatty ester, diglycerine fatty ester, diglycerine fatty dibasic ester and glycerine fatty dibasic ester (often in combination with ethylene oxide, propylene oxide, butylene oxide and other alkene oxides). For example, the following commercial compounds may serve as anti-static and anti-fogging agents: sorbitan palmitate, sorbitan stearate, sorbitan stearate-ethylene oxide (2 mol.), sorbitan stearate-propylene oxide (3 mol.), sorbitol stearate, sorbitol stearate-propylene oxide (3 mol.), diglycerine palmitate, diglycerine stearate, glycerine stearate, glycerine palmitate-ethylene oxide (2 mol.), sorbitan stearate-adipate-ethylene-ethylene oxide (3 mol.), sorbitol stearate-adipate-ethylene oxide (2 mol), diglycerine-palmitate-sebacate-propylene oxide (3 mol.), sorbitol palmitate-adipate (3 mol.), and mixtures thereof.

Ultraviolet inhibitors include hydroquinone disalicylates and phenylsalicylate, paraoctylphenylsalicylate, 2,2'-hydroxy-4-methoxy benzophenone, 2,2'-hydroxy-4,4'-dimethoxy benzo-phenone, 2-(2'-hydroxy-5'-methylphenyl) benzyltriazol, 2-(2'-hydroxy-5'-methylphenyl)-5,6-dichlorobenzyltriazol, cyanoacrylate, and mixtures thereof.

Anti-oxidants include phenols, thiopropanoates and fatty sulfites, and mixtures thereof.

Light stabilizers include 4-(phenyllacetoxy)-2,2,6,8,-tetrametylpiperazine, tris-(2,2,6,6,-tetramethyl-4-piperazyl) triazine-2,4,6-tricarboxylates, and mixtures thereof.

The films of the present invention are formulated by combining the PVC-based resin, primary plasticizer(s), stabilizer(s), and optional additives in the amounts specified above. This formulation is then mixed by a Hi-speed mixer and/or a Banbury intensive mixer. The mix is then calendered and/or extruded to film having a thickness ranging from 0.002 inch to 0.02 inch, preferably from 0.003 inch to 0.01 inch, and most preferably from 0.004 inch to 0.008 inch. Calendering and extrusion processes for forming PVC film are well known in the art (see *Encyclopedia of PVC*, Leonard L. Nass ed., Marcel Dekker, Inc. pub., pp. 1251–1312 and 1361–1414, 1977) (incorporated herein by reference).

The PVC film of the present invention may be interleaved with a paper or laminate which will allow the film to peel off easily. The exposed surface of the film is may then be printed by know techniques. Inks which find particular application to the PVC film of the present invention are oil-, alcohol-, water- and solvent-based inks. Standard printing methods include Flexo, Offset, Screen and Gravure (see *Technical Guide Book of the Screen Printing Industry*, SPAI (Screen Printing Association Int'l) pub., Section K6, pp. 1–4, 1984) (incorporated herein by reference).

In the following examples, it will be appreciated that, although specific embodiments of the invention are described, various modifications may be made without deviating from the spirit and scope of the invention.

EXAMPLES

Example 1

Film 1

The following formulation is used in the experiments which follow, unless otherwise indicated:

| PVC-Based Resin: | |
|---|---|
| PVC Resin ($\bar{p}$) = 950, i.v. = 0.92 | 100 PPHR |
| Plasticizer(s): | |
| Butyl Benzyl Phthalate | 55 PPHR |
| Stabilizer(s): | |
| Epoxy Soybean Oil ("ESO") | 2 PPHR |
| Barium Zinc Mixture | 2 PPHR |
| Additive(s): | |
| Pigment | .07 PPHR |

(PVC Resin—Shintech, grade SE-950; Butyl Benzyl Phthalate—Monsanto Chemical Co., grade S-160; Epoxy Soybean Oil—Argus Chemical, grade Drapex 6.8; Barium Zinc Mixture—Bearlocher, grade UBZ-791; Pigment—Cyanamid, color index violet 13).

The manufacture of the various films utilized in this experiment is illustrated in the attached FIGURE. The above formulation is first mixed in a Hi-speed mixer (10) for 7 minutes (Henshers mixer), then in a Banbury mixer (20) for 4 minutes. The mixture is passed through a first heated (280° F.–340° F.) roll mill (30) and a heated (200° F.–320° F.) extruder for screening through a screen (45). The heated, screened mixture passes through a second heated (280° F.–340° F.) roll mill (32), and is then transferred to a heated (320° F.–365° F.) calender (50) and pressed to form a sheet (55) having a thickness of 0.008 inch. The sheet is removed from the calender by take-off rolls (60) and passed over a series of cooling drums (70). Lastly, the film is wound by a winding system (80) into a roll (82).

The film formed by the above process steps is evaluated for printability, with the following scale being employed:

A Excellent printability
B Printing a little uneven in a thin layer
C Even thinner layers of ink produce more inferior results.

The surface tension of the film is determined immediately after production. The film is then stored at 75° F. and at a relative humidity (RH) ≧50% for two weeks, and the surface tension remeasured. The results of these tests (and Films 2–16 below) are summarized in Table 1.

Film 2

BBP was replaced with 55 PPHP bis-2-methoxyethyl phthalate (BMEP). All other ingredients remained the same. The same properties were measured as in Film 1.

Film 3

BBP was replaced with 55 PPHR tricresyl phosphate (TCP). All other ingredients remained the same. The same properties were measured as in Film 1.

Film 4

The BBP concentration was changed to 30 PPHR and di-2-ethylhexyl phthalate (DEHP) was added at a concentration of 25 PPHR. The rest of the ingredients remained the same. The same properties was measured as in Film 1.

Film 5

BBP was replaced with 55 PPHR trixylenyl phosphate (TXP). All other ingredients remained the same. The same properties were measured as in Film 1.

Film 6

BBP was replaced with 55 PPHR cresyldiphenyl phosphate (CDPP). All other ingredients remained the same. The same properties were measured as in Film 1.

Film 7

BBP was replaced with 55 PPHR polypropylene glycol polyadipate (PPGPA). All other ingredients remained the same. The same properties were measured as in Film 1.

Film 8

BBP was replaced with polybutylene glycol polyadipate (PBGPA). All other ingredients remained the same. The same properties were measured as in Film 1.

Film 9

(A)

The barium-zinc stabilizer was changed to 2 PPHR calcium-zinc stabilizer. All other ingredients remained the same. The same properties were measured as in Film 1.

(B)

The barium-zinc stabilizer was changed to 2 PPHR barium-cadmium stabilizer. All other ingredients remained the same. The same properties were measured as in Film 1.

Film 10

BBP was used at a concentration of 30 PPHR and bis-2-methoxyethyl phthalate (BMEP) was added at a concentration of 25 PPHR. All other ingredients remained the same. The same properties were tested as in Film 1.

Film 11

BBP was use at a concentration of 30 PPHR and trixylenyl phosphate (TXP) was added at a concentration of 25

PPHR. All other ingredients remained the same. The same properties were tested as in Film 1.

Film 12

BBP was use at a concentration of 30 PPHR and polypropylene glycol polyadipate (PPGPA) was added at a concentration of 25 PPHR. All of the other ingredients remained the same. The same properties were tested as in Film 1.

Film 13

BBP was use at a concentration of 20 PPHR, and trixylenyl phosphate (TXP) was added at a concentration of 20 PPHR and polypropylene glycol polyadipate (PPGPA) was added at a concentration of 15 PPHR. All of the other ingredients remained the same. The same properties were tested as in Film 1.

Film 14

BBP was replaced with 55 PPHR di-2-ethylhexyl phthalate (DEHP). All other ingredients remained the same. The same properties were measured as in Film 1.

Film 15

BBP was replaced with 55 PPHR dibutyl phthalate (DBP). All other ingredients remained the same. The same properties were measured as in Film 1.

Film 16

BBP was used at a concentration of 14 PPHR, and di-2-ethylhexyl phthalate (DEHP) was added at a concentration of 41 PPHR. All other ingredients remained the same. The same properties were measured as in Film 1.

Preparation:

A slab of film, no less than ten (10) layers in thickness, is removed from a roll of film, taking care that the individual layers are not separated during the removal. A block (8.25 inches×9.25 inches) is cut from this slab. This sample is then conditioned at a temperature of 75° F. (room temperature) and a relative humidity of 50% for a period of 24 hours.

Procedure:

From the block prepared above, working from one end, two layers of the PVC film are separated (using care not to peel the two layers apart). These two layers of PVC film are then peeled apart for a distance of about 2 inches. The loose ends are griped in the clamps of a universal type tensile tester. Thwing-Albert Intellect II equipment was employed in this experiment and the tester set to 6 inches per minute. The above procedure is repeated a minimum of three times.

Results:

Several films of Example 1 (i.e., Film 1, Film 4, Film 9(B) and Film 14) were tested according to the above procedures. The results of these tests are presented in Table 2.

TABLE 2

|  | Plasticizer(s) Used | Stabilizers Used | Tackiness value in lb/inch |
|---|---|---|---|
| Film 1 | BBP (55 PPHR) | Ba/Zn/ESO | 1.20 |
| Film 4 | BBP (30 PPHR) |  |  |
|  | DEHP (25 PPHR) | Ba/Zn/ESO | 0.52 |
| Film 9(B) | BBP (55 PPHR) | Ba/Cd/ESO | 1.00 |
| Film 14 | DEHP (55 PPHR) | Ba/Zn/ESO | 0.30 |

Film 1 and 9(B), which utilized a primary plasticizer of the present invention, exhibited superior tackiness over film 14, which employed the general plasticizer DEHP.

TABLE 1

|  | Plasticizer(s) Used | Stabilizers Used | Printability | After Prod. Surface tension | 2 weeks Room-temp 75° F. RH ≥ 50% |
|---|---|---|---|---|---|
| Film 1 | BBP (55 PPHR) | Ba/Zn/ESO | A | 40–41 | 38–40 |
| Film 2 | BMEP (55 PPHR) | Ba/Zn/ESO | A | 40–41 | 39–40 |
| Film 3 | TCP (55 PPHR) | Ba/Zn/ESO | A | 41–42 | 40–41 |
| Film 4 | BBP (30 PPHR) DEHP (25 PPHR) | Ba/Zn/ESO | A | 38–39 | 37–38 |
| Film 5 | TXP (55 PPHR) | Ba/Zn/ESO | A | 38–39 | 37–38 |
| Film 6 | CDPP (55 PPHR) | Ba/Zn/ESO | A | 41–42 | 40–41 |
| Film 7 | PPGPA (55 PPHR) | Ba/Zn/ESO | A | 41–42 | 40–41 |
| Film 8 | PBGPA (55 PPHR) | Ba/Zn/ESO | A | 39–40 | 38–39 |
| Film 9 (A) | BBP (55 PPHR) | Ca/Zn/ESO | A | 40–41 | 39–40 |
| Film 9 (B) | BBP (55 PPHR) | Ba/Cd/ESO | A | 40–41 | 39–40 |
| Film 10 | BBP (30 PPHR) BMEP (25 PPHR) | Ba/Zn/ESO | A | 39–40 | 38–39 |
| Film 11 | BBP (30 PPHR) TXP (25 PPHR) | Ba/Zn/ESO | A | 38–39 | 37–38 |
| Film 12 | BBP (30 PPHR) PPGPA (25 PPHR) | Ba/Zn/ESO | A | 40–41 | 39–40 |
| Film 13 | BBP (20 PPHR) TXP (20 PPHR) PPGPA (15 PPHR) | Ba/Zn/ESO | A | 38–39 | 37–38 |
| Film 14 | DEHP (55 PPHR) | Ba/Zn/ESO | C | 34–35 | 32–33 |
| Film 15 | DBP (55 PPHR) | Ba/Zn/ESO | C | 34–35 | 32–33 |
| Film 16 | DEHP (41 PHR) BBP (14 PPHR) | Ba/Zn/ESO | B | 35–36 | 34–35 |

Example 2

The ability of the films of the present invention to self-cling is measured by their tackiness value. Tackiness may be determined by the peel test described below.

Moreover, Film 4 demonstrates that a primary and general plasticizer mixture may be employed (i.e., BBP and DEHP) and still yield improved tackiness over a film made from general plasticizer only.

From the foregoing, it will be appreciated that, although specific embodiments of the invention have been described herein for purposes of illustration, various modifications may be made without deviating from the spirit and scope of the invention. Accordingly, the invention is not limited except as by the appended claims.

We claim:

1. A printable self-clinging flexible film consisting essentially of a PVC-based resin, butyl benzyl phthalate as a primary plasticizer in an amount ranging from 40 to 90 parts per hundred resin, and a stabilizer in an amount ranging from 0.1 to 10 parts per hundred resin, wherein said film has a surface tension greater than 35 dynes/cm and has a thickness ranging from 0.002 inches to 0.02 inches.

2. The film of claim 1 wherein at least a portion of a surface of the film has a layer of ink.

3. The film of claim 1 wherein the surface tension is greater than 37 dynes/cm.

4. The film of claim 1 wherein the PVC-based resin comprises a PVC resin having a degree of polymerization ranging from 650 to 1600, and an inherent viscosity ranging from 0.6 to 1.2.

5. The film of claim 1 wherein the PVC-based resin comprises a mixture of PVC resins, wherein each PVC resin has a degree of polymerization ranging from 650 to 1600, and an inherent viscosity ranging from 0.6 to 1.2.

6. The film of claim 1 wherein the PVC-based resin further comprises a monomer or monomer blend in an amount up to 10 parts per hundred resin.

7. The film of claim 6 wherein the monomer is selected from the group consisting of vinyl acetate, ethylene, propylene, maleate, methacrylate, acrylate, high alcohol vinyl ester, urethane, chlorinated urethane, methylmethacrylate, and mixtures thereof.

8. The film of claim 6 wherein the monomer blend is selected from the group consisting of ethylene-vinyl acetate copolymer, acrynitril-butadiene-styrene terpolymer, acrynitrile-butadiene copolymer, and mixtures thereof.

9. The film of claim 1 wherein the primary plasticizer further comprises a general plasticizer in an amount up to 50% of the total amount of primary and general plasticizer, wherein the general plasticizer is selected from the group consisting of di-n-octyl phthalate, di-2-ethylhexyl phthalate, dibutyl phthalate, diisononyl phthalate, diisobutyl phthalate, didecyl phthalate, dibenzyl phthalate, dicyclohexyl phthalate, dinonyl phthalate, octylcapryl phthalate, tributyl phosphate, triethyl phosphate, trichloroethyl phosphate, trioctyl phosphate, tris-isopropylphenyl phosphate, dibutyl sevacate, dioctyl sebacate, triacetyl glycerine, glycerol sebacate, diisodecyl succinate, diisodecyl adipate, di-n-butyl maleate, tri-n-butyl citrate, methylacetyl riconolate, butyl oleate, glycerin monoricinolate, trilellitates, chloride parrafin, and mixtures thereof.

10. The film of claim 1 wherein the stabilizer is selected from the group consisting of metal soaps, organic phosphites, epoxy compounds, tin stabilizers, and mixtures thereof.

11. The film of claim 10 wherein the metal soap stabilizers are selected from the group consisting essentially of zinc stearate, barium stearate, calcium stearate, cadmium stearate, barium ricinolate, calcium oleate, calcium laurelate, zinc octoate, and mixtures thereof.

12. The film of claim 10 wherein the organic phosphite stabilizers are selected from the group consisting of diphenyldecyl phosphite, triphenyl phosphite, trisnonylphenyl phosphite, tri-steareal phosphite, octyldiphenyl phosphite, and mixtures thereof.

13. The film of claim 10 wherein the epoxy compound stabilizers are selected from the group consisting of epoxy soybean oil, epoxy linseed oil, epoxy polybutadiene, epoxy methylstearate, epoxy stearate, epoxy ethylhexyl stearate, epoxy stearyl stearate, epoxy propyl isocyanalate 3-(2-caseino)-1,2-epoxy propane, epoxy-bisphenol a didiglycyzyl ester, vinyl dicyclohexanediepoxide, 2,2-bis-(4-hydroxyphenol) propane and epichlorohydrine condensation copolymeration, and mixtures thereof.

14. The film of claim 10 wherein the tin stabilizers are selected from the group consisting of dibutyl tin dilaurate, dibutyl tin maleate, organic tin mercaptide and organic tin sulfonic amide, and mixtures thereof.

15. The film of claim 1 wherein the stabilizer ranges from 1 to 5 parts per hundred resin.

16. The film of claim 1 wherein the stabilizer is a mixture of metal soaps and epoxy compounds.

17. The film of claim 16 wherein the metal soaps are selected from zinc stearate, barium stearate and calcium stearate, and the epoxy compound is epoxy soybean oil.

18. The film of claim 17, further including an organic phosphite stabilizer.

19. The film of claim 1, further comprising an additive selected from the group consisting of anti-static agents, anti-fogging agents, ultra-violet inhibitors, anti-oxidants, light stabilizers, fire retardants, pigments, and mixtures thereof.

* * * * *